United States Patent [19]

Teratani et al.

[11] 4,081,740
[45] Mar. 28, 1978

[54] VEHICLE ALTERNATOR SYSTEM WITH NOISE FILTER

[75] Inventors: Tatsuo Teratani; Yoshitaka Kuroyanagi, both of Toyota, Japan

[73] Assignee: Toyota Jidosha Kogyo Kabushiki Kaisha, Toyota, Japan

[21] Appl. No.: 669,031

[22] Filed: Mar. 22, 1976

[30] Foreign Application Priority Data

Mar. 31, 1975 Japan .................................. 50-39323
Jun. 13, 1975 Japan .................................. 50-2447

[51] Int. Cl.$^2$ ......................... H04B 15/00; H02J 7/22
[52] U.S. Cl. ..................................... 322/28; 325/313; 361/308
[58] Field of Search .................. 325/312, 313; 320/64; 322/7, 28, 32; 317/256, 257, 260; 361/307, 308

[56] References Cited

U.S. PATENT DOCUMENTS

| | | | |
|---|---|---|---|
| 2,073,880 | 3/1937 | Robinson | 317/257 X |
| 2,711,504 | 6/1955 | King | 320/64 X |
| 2,912,594 | 11/1959 | Raver | 320/64 X |
| 3,739,245 | 6/1973 | Fuchshuber et al. | 317/260 X |

*Primary Examiner*—Robert J. Hickey
*Attorney, Agent, or Firm*—Koda and Androlia

[57] ABSTRACT

An electric power source apparatus for vehicles comprises a dynamo and a voltage regulator which includes mechanical relays, the switching of which causes high frequency noises, which in turn adversely affect a radio receiver set mounted on the vehicle. To eliminate the high frequency noises a noise absorbing capacitor is disposed between the dynamo and the voltage regulator.

1 Claim, 13 Drawing Figures

VEHICLE ALTERNATOR SYSTEM WITH NOISE FILTER

BACKGROUND OF THE INVENTION

1. Field of the Invention

The present invention relates to an electric power source apparatus for vehicles having a dynamo and a voltage regulator, and more particularly to such an electric power source apparatus which enables to eliminate high frequency noises generated by making and breaking of relay contact in the voltage regulator.

2. Description of the Prior Art

A dynamo is mounted on a vehicle to charge a vehicle-mounted battery during the rotation of an engine. Since such a dynamo generates a voltage the magnitude of which corresponds to the rotation speed of the engine, the output voltage from the dynamo is regulated by a voltage regulator so that the generated voltage amplitude corresponds to the voltage amplitude of the battery. This regulation is usually carried out in the following manner. The output voltage from the voltage regulator changes in response to the generated voltage of the dynamo, and an exciting current of the dynamo is controlled by the output voltage of the regulator whereby the output voltage of the dynamo is controlled. A contact type voltage regulator and a contactless voltage regulator are known. The former comprises mechanical relays while the latter includes electronic circuits instead of mechanical relays. Because the voltage regulator for vehicles is used in such an adverse environment, it is mostly of contact type. Since the contactless type is expensive to compare with the contact type, the use of the former is limited to a high class car even when it is used for vehicle. One of the problems encountered in the contact type voltage regulator is that switching of the contacts occur frequently in the process of voltage regulation. As a result, high frequency noise components are generated in response to the switching of the contacts and they are passed to a vehicle-mounted FM radio receiver or other communication equipments as noises. Particularly, in an automobile car comprising a defogger wire, a FM-wave receiving antenna is located nearly the deffoger wire and opposite thereto. Practically, the distance between the FM-wave receiving antenna and the defogger wire is of cm order, so that high frequency noises generated in the regulator are easily transmitted to the FM-wave receiving antenna from the deffoger wire by an electromagnetic coupling effect and an electrostatic coupling effect. The noise received by the FM-wave receiving antenna is fed to the FM-radio receiver through a feeder line to defect the FM-radio receiver with the noise. For example, in a vehicle which mounts an FM radio receiver set, the above noises will not a significant problem if the receiving point is very near from the FM transmitting station. However, when the receiving point is distant from the transmitting station, a problem of reduction in S/N ratio arises. In order to eliminate the high frequency noises due to the switching of the contacts of the contact type voltage regulator, several approaches have been proposed. A first approach is to provide a noise absorbing capacitor between a line (line B) connecting the voltage regulator and an output terminal of the dynamo, and a ground point on a chassis. In this approach, there is a disadvantage in that the noises in high frequency region such as 80MHz or higher cannot be eliminated. One of the reasons therefor is that since the chassis is grounded a distributed constant circuit is formed on the chassis, which prevents an inherent object of grounding from being accomplished. The above described effect of the distributed constant circuit appears markedly at the FM frequency band. A second reason is that since there exists non-negligible distance between the line B and the chassis, it is impossible to connect the capacitor directly across the line B and the chassis and hence it must be connected through lines. In the high frequency range such as FM frequency band, the lines themselves exhibit inductive components. Since the inductive components impede the passage of high frequency signal, they sacrifice the inherent function of capacitor, of eliminating high frequency signal or noise. There exists a fixed distance between the line B and the chassis, as stated before, because the relation between the chassis structure and electrical wiring is restricted by the design of various parts and other design matters.

A second approach is to insert a noise eliminating capacitor to a line connected to the line B of the voltage regulator. In this approach, since the capacitor is connected in the voltage regulator, the length of lines connected to the capacitor can be shortened. There are two methods in connecting one end of the capacitor connected to the line B and the opposite end. Firstly, the one end is connected to the chassis, like in the first approach, to operate as chassis ground. In this case, since a distributed constant circuit is formed on the chassis like in the first approach, the noise elimination ability is deteriorated. Secondly, the one end is connected to a line specially provided for grounding. This method can eliminate the drawback encountered in the first method.

However both of the above two methods have a common disadvantage. That is, voltage dividing resistors for selectively passing exciting current to an exciting coil of the dynamo are provided in the voltage regulator. A large current flows through the voltage dividing resistors, which are then heated through power dissipation. Temperature in the voltage regulator rises by the heat generated by the resistors. By this temperature rise the noise eliminating capacitor is directly influenced so that the characteristic of the capacitor changes. In order to avoid the above inconvenience, it may be proposed to use a heat-proof capacitor. However, since such a heat-proof capacitor is expensive and of large size it is not commonly accepted to provide the capacitor in the voltage regulator.

SUMMARY OF THE INVENTION

It is a primary object of the present invention to provide an electric power source apparatus for vehicles capable of eliminating noises both in high frequency region and in low frequency region.

It is other object of the present invention to provide an electric power source apparatus for vehicles which is so constructed as to enhance S/N ratio of vehicle-mounted radio receiver and other communication equipments, particularly those vehicle-mounted communication equipments which are used in an FM frequency band.

It is other object of the present invention to provide an electric power source apparatus for vehicles which enables the elimination of noises by merely providing a capacitor at a special location.

It is still other object of the present invention to provide an electric power source apparatus for vehicles capable of completely eliminating the noises and having a noise eliminating capacitor of special construction, particularly at a terminal structure thereof.

It is a further object of the present invention to provide an electric power source apparatus for vehicle capable of eliminating the noises and having an exclusive line for grounding, particularly a copper board grounding line, rather than a chassis grounding line.

DETAILED DESCRIPTION OF THE INVENTION

Figure 1:
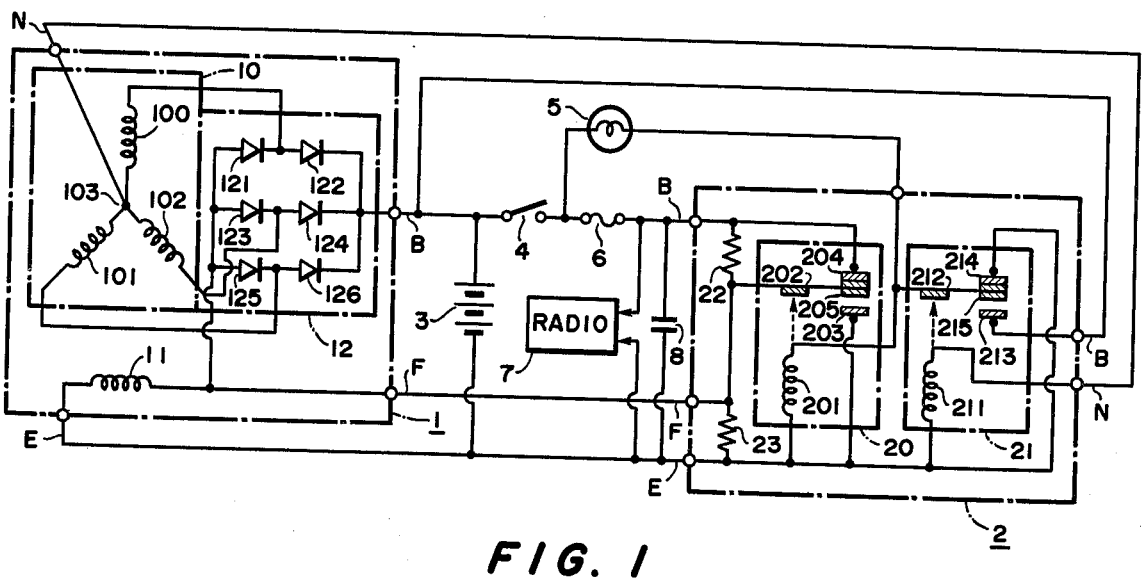
FIG. 1 shows an embodiment of an electric power source apparatus of the present invention.

In one embodiment of the present invention illustrated in FIG. 1, there is provided a capacitor 8 in accordance with the present invention. In order to assist the understanding, a circuit configuration which does not include the capacitor 8 and the operation thereof will be first explained. This is important in clarifying the relation in the circuit configuration between the present invention and the prior art. The description of the principal portions of the present invention will follow after the description of the prior art configuration.

The illustrated embodiment comprises a dynamo 1 and a voltage regulator 2, and between the dynamo 1 and the voltage regulator 2 there are provided a battery 3, a key switch 4, a lamp 5, a fuse 6, a radio receiver set 7 and the capacitor 8. Furthermore, several lines connect the dynamo 1 with the voltage regulator 2. The dynamo 1 comprises a Y-connection armature coil 10, an exciting coil 11 and a diode rectifier 12. The armature coil 10 include a neutral point 103 and armature coil elements 100, 101, and 102 for U, V and W phases, respectively. The armature coil 10 is set as a stator while the exciting coil 11 is set as a rotor.

The diode rectifier 12 comprises six diodes 121, 122, 123, 124, 125 and 126. The diode pairs 121 and 122, 123 and 124, and 125 and 126 are connected in series, respectively. The corresponding ends of those series-connected pairs are connected in common. The anode common terminal is connected to one end of the exciting coil 11 while the cathode common terminal is connected to an external lead. Junctions in the series-connected diode pairs are connected to output terminals of the armature coils 100, 101 and 102, respectively.

The voltage regulator 2 comprises a first relay 20, a second relay 21 and resistors 22 and 23. The first relay 20 includes an electromagnetic coil 201, an armature 202, stationary contacts 203 and 204, and a movable contact 205 which is linked to the armature 202. The second relay 21 includes an electromagnetic coil 211, an armature 212, stationary contacts 213 and 214, and a movable contact 215 which is linked to the armature 212.

Designating the wire harness line connected to the cathode terminal of the rectifier 12 of the dynamo 1 as a line B, the line B is connected to one end of the armature 212 of the second relay 21 of the voltage regulator 2 through the lamp 5. The line B is further connected to one end of the resistor 22 of the voltage regulator 2 through the key switch 4 and the fuse 6.

Designating the wire harness line connected to one end of the exciting coil 11 or to the terminal to which the anode terminal of the diode rectifier 12 is connected as a line F, the line F is connected to one end of the resistor 23 of the voltage regulator.

On the other hand, designating the wire harness line connected to the other end of the exciting coil 11 as a line E, the line E is connected to a common grounding terminal of the voltage regulator 2.

The neutral point 103 of the armature coil 10 of the dynamo 1 is connected to a line N which is connected to one end of the electromagnetic coil 211 of the second relay 21 of the voltage regulator.

The battery 3 is connected across the lines B and E of the dynamo 1. The FM radio receiver set 7 is connected across the lines B and E of the voltage regulator 2.

The operation of the circuit is now explained. When the key switch 4 is closed, an engine (not shown) is started. At this moment, the voltage of the battery 3 is applied through the line B, the switch 4 and the fuse 6 to one end of the resistor 22 in the voltage regulator 2. At the time of start, the movable contacts 205 and 215 of the first and second relays 20 and 21 are in contact with the stationary contacts 204 and 214, respectively, as shown in the drawing. Therefore, at the time of start, the resistor 22 is shortcircuited. As a result, the voltage of the battery 3 is applied directly across the resistor 23. Because of this voltage drop, an exciting current flows through the exciting coil 11. As a result, a voltage corresponding to the rotation speed of the engine is generated at the armature coil 10 and a voltage is developed at the neutral point 103. When the voltage at the neutral point 103 reaches a predetermined value, a current flows through the line N to the electromagnetic coil 211 of the second relay 21, attracting the armature 212. As a result, the movable contact 215 leaves the stationary contact 214 and shifts to the stationary contact 213. When the movable contact 215 makes contact with the stationary contact 213, a voltage developed across the armature coil 10 of the dynamo and rectified by the rectifier 12 is applied to the electromagnetic coil 201 of the first relay 20 through the line B, the stationary contact 213 and the movable contact 215. That is, the electromagnetic coil 201 is subjected to the influence by the voltage generated across the armature coil 10 of the dynamo 1. When the voltage generated exceeds a predetermined value, the armature 202 is attracted through the electromagnetic coil 201 and the movable contact 205 leaves the stationary contact 204. As the generated voltage further rises, the movable contact 205 makes contact with the stationary contact 203. That is, the relay 20 has three states. At a first state, the movable contact 205 makes contact with the stationary contact 204. At this state, the voltage of the battery 3 is directly applied across the resistor 23. At a second state, the movable contact 205 leaves the stationary contact 204 and yet does not make contact with the stationary contact 203. At this state, the voltage of the battery 3 is divided by the resistors 22 and 23 so that the divided voltage is applied to the resistor 23. At a third state, the movable contact 205 makes contact with the stationary contact 203. At this state, the resistor 23 is short-circuited. Each of the above three states can be established by the amount of current flowing through the electromagnetic coil 201. The current flowing through the exciting coil 13 of the dynamo 1 corresponds to the above three states. In other words, the above three states define the amount of current flowing through the coil 13. At the first state, an exciting current determined by the voltage of the battery 3 flows, at the second state, an exciting current determined by a voltage smaller than the battery voltage or a divided voltage flows, and at the third state no exciting current flows. In this manner the output voltage of the dynamo is regulated in accordance with the operational state of the relay 20. The above operation of the movable contact of the relay 20 is frequently repeated during the rotation of the engine so that the output voltage of the dynamo 1 is properly controlled.

The number of operations of the movable contact 205 of the relay 20 through its three states reaches up to about 50 per second during non-load condition or idling. As a result, high frequency currents generated by the movable contact 205 at the switching thereof flow over the lines B and F. Accordingly, the high frequency current is supplied as noise to the radio receiver set 7 which uses the voltage across the lines B and E as a power supply. Further, this noise reaches at the FM antenna through the defogger wire, and comes into the circuit of the FM radio as noise. This results in a significant influence to the operation of the radio receiver set 7. The same problem occurs when wireless equipments other than the radio receiver set 7 are provided. The above high frequency noise reaches up to several tens of MHz. Consequently, it is introduced as noise to communication equipments which uses FM system.

To eliminate such noise, several approaches as discussed in connection with the prior art have been proposed. Discussing this in conjunction with FIG. 1, in the first approach of the prior art, there is provided a capacitor 8, one end of which is connected to the line B connecting the fuse 6 with the voltage divider 2 through a separate line (lead) and the other end of which is connected to the chassis through another line (lead). In the second approach of the prior art, one end of the capacitor is connected to a line in the voltage regulator connecting one end of the resistor 22 and the line B. The other end of the capacitor may be either connected to the chassis or connected to a separate line exclusively provided for grounding, or in the illustrated example the line connecting the line E and the resistor 23, as described above. The problems encountered in this approach has also been discussed in connection with the prior art. The dividing resistor referred to in the prior art corresponds to the resistor 22 in FIG. 1. The resistance thereof is usually set to about 5 ohms. Because current flows through the resistor 22 having the resistance of about 5 ohms, heat is generated therefrom.

The capacitor 8, which is a heart of the present invention, is now explained. One end of the capacitor 8 is connected to the line B connecting the fuse 6 with the voltage regulator 2, and the other end is connected to the line E connecting the exciting coil 11 with the voltage regulator 2. The line E is specially provided as a grounding line. This makes the apparatus essentially distinct from the chassis grounding. The capacitance of the capacitor 8 is set within 0.001 $\mu$F to 1 $\mu$F. By providing the capacitor 8, the high frequency noises appearing over the lines B and E can be absorbed. This will be discussed specifically in conjunction with FIG. 2.

Figure 2:
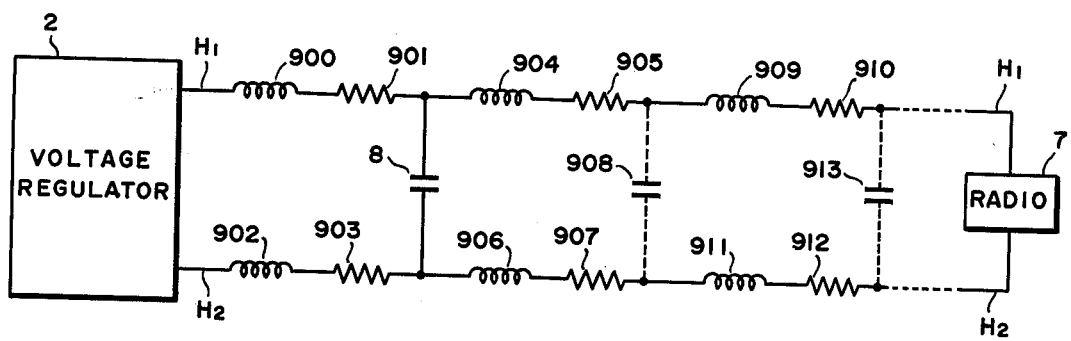
FIG. 2 shows an equivalent circuit viewed from a voltage regulator to a load.

The voltage regulator 2 and the radio receiver set 7 are connected via two lines, which are now designated as $H_1$ and $H_2$. In the frequency range in which the high frequency noise discussed above appears, the lines $H_1$ and $H_2$ forms a distributed constant circuit. This relation is illustrated in FIG. 2, in which inductance components 900, 902, 904, 906, 909 and 911 appearing in the lines $H_1$ and $H_2$ represent the inductive elements in the distributed constant circuit, resistors 901, 903, 905, 907, 917 and 912 represent the resistive elements in the distributed constant circuit, and capacitors 908 and 913 appearing across the lines $H_1$ and $H_2$ represent capacitive elements of the distributed constant circuit. The length of lines between the voltage regulator 2 and the radio receiver set 7 widely changes depending on the size of vehicle or setting of wire-harness. Therefore an impedance when viewed from the voltage regulator 2 to the radio receiver set 7 changes with the length of the lines. The impedance is now considered without taking the length of the lines into consideration. Assume that the impedance as viewed from the voltage regulator 2 to the radio receiver set 7 is in the range of 100 to 200 ohms. On the other hand, the impedance as viewed from the opposite ends of the capacitor 8 disposed intermediate along the line $H_1$ and $H_2$ is also approximately 100 to 200 ohms because the distance between the voltage regulator 2 and the capacitance 8 is set to a negligible value. Accordingly, by setting the impedance of the capacitor 8 to 5 to 10 ohms in the frequency range of high frequency component, the high frequency component appearing on the line $H_1$ and $H_2$ by the voltage regulator 2 does not flow into the radio receiver set 7 but is is shunted by the capacitor 8.

Figure 3:
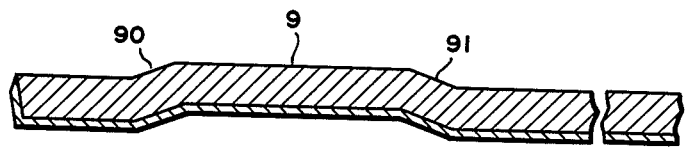
FIG. 3 shows a particular example of a line E.

An example of the structure of the line E is shown in FIG. 3, in which the line E comprises a copper plate 9. Since the copper plate 9 extends within the chassis of vehicle, it may be flat or it may have shoulders 90 and 91 as illustrated, depending on the construction of the chassis and where the line E extends.

Figure 4:
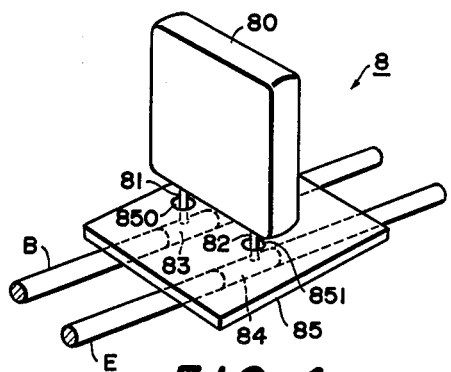
FIGS. 4 and 5 illustrate the connection of a capacitor to lines B and E.

FIG. 4 illustrates an example of the connection of the capacitor 8 with the lines B and E. The capacitor 8 comprises a body 80 and lead terminals 81 and 82. The body 80 includes a capacitance portion and a casing which externally surrounds the capacitance portion while they are not shown. The line E may be formed by a copper plate as shown in FIG. 3 but in the illustrated example it is formed by a copper wire having a large diameter. The lines B and E are soldered at soldering points 83 and 84 to connect with the lead terminals 81 and 82. The soldered joints between the lead 81 and the line B and between the lead 82 and the line E might be broken by external vibration. In order to protect the joints from the vibration, there is provided a protective board 85 between the lines B and E and the body 80. The protective board 85 has two through-holes 850 and 851 formed therein, through which the leads 81 and 82 extend.

Figure 5:
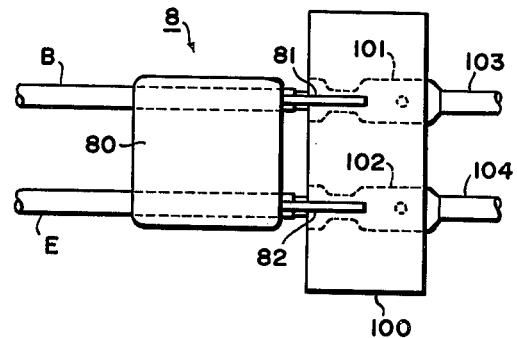

FIG. 5 shows other embodiment of connecting the capacitor 8. The lines B and E are connected to the dynamo 1 and the voltage regulator 2, respectively, through connectors provided at the dynamo 1 and the voltage regulator 2. In the present embodiment, the capacitor is connected utilizing the connector at the voltage regulator 2. In FIG. 5, the connector 100 connects the lines B and E with the lines 103 and 104 leading to the voltage regulator 2, respectively, by means of members 101 and 102. That is, the lines B and E and the leads 81 and 82 of the capacitor 8, respectively, are superimposed one on the other and inserted into the ends of the members 101 and 102 which face to the lines B and E, and then they are pressed together. With the above structure, the protective board 85 against the externally applied vibration shown in FIG. 4 is no longer necessary, and the number of parts does not increase because a connector which has been necessarily provided can be utilized.

Figure 6:
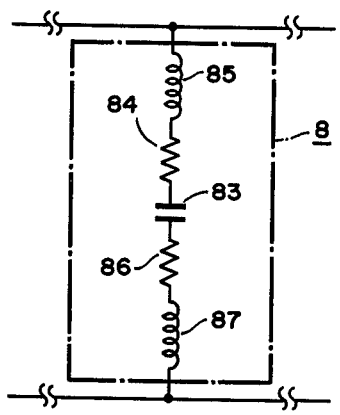
FIG. 6 shows an equivalent circuit of the capacitor.

A further development of the present invention will now be discussed. In a high frequency region it may happen that the leads of the capacitor themselves constitute a distributed constant circuit. Particularly in a very high frequency range such as 80 - 90 MHz range, a distributed constant circuit is necessarily formed by the leads. FIG. 6 shows an equivalent circuit of the capacitor under such a circumstance. In the drawing, capacitance 83 represents a pure capacitive component of the capacitor 83 while inductive component 85, and resistive component 84, and inductive component 87 and resistive component 86, respectively, represent the components appearing in the leads 81 and 82. Because of these components, the capacitor 8 might not attain its inherent function as a capacitor.

In order to prevent the leads 81 and 82 from forming the distributed constant circuit or in order to enable to neglect the distributed constant circuit even if it is formed, the length of the leads 81 and 82 may be shortened. The length of the leads of the capacitor changes from type to type of the capacitor. The lengths of the leads of commercially available capacitors are usually set to 5 mm, 10 mm and 30 mm, in typical cases. They are determined in accordance with domestic standards in each country. An experiment showed that a capacitor having the lead length of 5 mm formed an appreciable distributed constant circuit. Therefore it follows that the capacitors having the lead length of 10 mm or 30 mm cannot be used for removing the noises in the high frequency range. If the leads can be cut off to the length shorter than 5 mm, it will provide an ideal capacitor for eliminating the noises. However when the lead length is less than 5 mm, the connection of the lines B and E will be very difficult. For example, in the embodiments shown in FIGS. 4 and 5, it is easily seen that the connection of the capacitor having the lead length of less than 5 mm is very difficult. In the light of the above, the structure of the capacitor must be further improved. A capacitor having improved leads is now explained with reference to the drawing.

Figure 7:
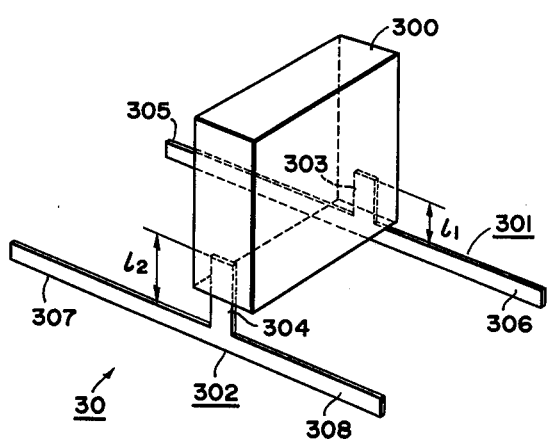
FIG. 7 shows an embodiment of a capacitor specially provided in the present invention.
Figure 8:
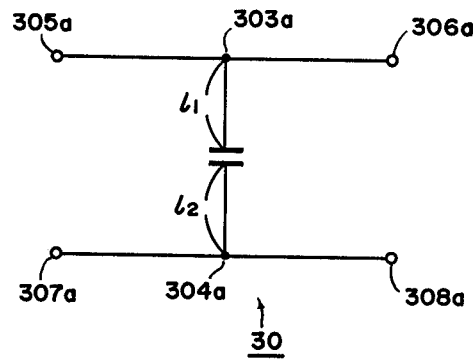
FIG. 8 is a circuit diagram when said capacitor is viewed as an electrical circuit.

Referring to FIG. 7 which shows an embodiment of a capacitor 30 in accordance with the present invention and FIG. 8 which shows electrical diagram of the embodiment, a capacitor body 300 comprises a capacitance portion having a pair of internal electrodes (not shown) and a casing which externally seals the capacitance portion. Attached to the pair of electrodes of the capacitor body 300 are a pair of leads 301 and 302 as shown. The pair of leads 301 and 302 includes arms 303 and 304, respectively, the ends of which are connected to the pair of electrodes of the capacitance portion, and arms 305 and 306, and 307 and 308, respectively, which actually serve as leads. The arms 303, 305 and 306 are formed as an integral unit and the arms 304, 307 and 308 are also formed as an integral unit, both units being of T-shape. The combination of the leads 301 and 302 constitutes a four-terminal circuit. The arms 303 and 304 have the lengths $l_1$ and $l_2$, respectively and the arms 305, 306, 307 and 308 have predetermined length. The lengths $l_1$ and $l_2$ of the arm 303 and 304 are set to a very short length, for example 3 mm or less. It should be understood that $l_1$ in either equal to or not equal to $l_2$ by the reason described later.

The arms 303 and 304 merely serve to lead the electrodes out of the capacitance portion of the body 300, and they are not provided for the purpose of the connection to external lines (lines B and E). It is the arms 305, 306, 307 and 308 that are provided for the purpose of the connection to the external lines. Therefore, the arms 303 and 304 need only be long enough to permit to lead the electrodes of the capacitance portion out of the body thereof. Consequently, the arms 303 and 304 can be very short.

FIG. 8 shows an electrical diagram of the above construction. Four terminals 305a, 306a, 307a and 308a represent those terminals of the arms 305, 306, 307 and 308 in FIG. 7 to which the lines B and E are connected. The capacitance portion is represented by 309. 303a and 304a indicate junction nodes of the arm 303 and the arms 305 and 306, and of the arm 304 and the arms 307 and 308, respectively. It will be more apparent from this electrical diagram that the present embodiment constitutes a four-terminal circuit.

Figure 9:
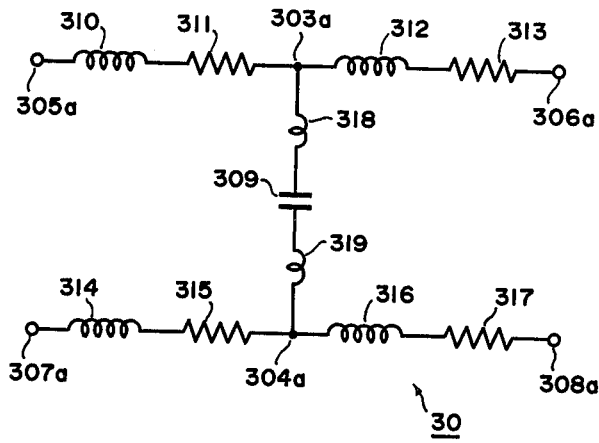
FIG. 9 is an equivalent circuit thereof.

FIG. 9 shows an equivalent circuit when the capacitor shown in the embodiment of FIG. 7 is used in the high frequency range. In the drawing, the arm 305 includes an inductive component 310 and a resistive component 311. The arm 306 includes an inductive component 312 and a resistive component 313. The arm 307 includes an inductive component 314 and a resistor component 315. The arm 308 includes an inductive component 316 and a resistive component 317. The arm 303 includes an inductive component 318 and the arm 304 includes an inductive component 319. Although the latter two arms also include resistive components, they can be in effect neglected because the arms are very short. Therefore they are omitted in the drawing.

With the above lead arrangement, it is the arms 305 and 306 and the arms 307 and 308 that are connected to the lines B and E, respectively. Since these arms are of four-terminal configuration, the capacitance portion 309 which directly functions to eliminate the noises, as shown in FIG. 9, is not directly influenced because the arms 305, 306, 307 and 309 can be regarded as lines forming parts of the lines B and E. Furthermore, since the portions connected to the lines B and E are the arms 305, 306, 307 and 308, the arms 303 and 304 which are directly coupled to the electrodes of the capacitance portion may be short. Accordingly, as shown in the equivalent circuit of FIG. 9, the resistive components included in the arms 303 and 304 are small enough to be neglected and the inductive components 318 and 319 are also very small. Let us compare the inductive components in the equivalent circuit of FIG. 6 and that of FIG. 9. In case of FIG. 6, when the length of the leads is 5 mm to 30 mm, the magnitudes of the inductive components 85 and 87 are 5 ohms to 10 Ω (at the frequency of 85 MHz). The overall inductive component of the capacitor 8 therefore reaches up to 10 ohms to several tens ohms. On the other hand, in case of FIG. 9, since the magnitudes of the inductive components 318 and 319 can be kept less than 1 ohm the total inductive component of the capacitor can be reduced down to 3 ohms to 5 ohms.

Figure 10:
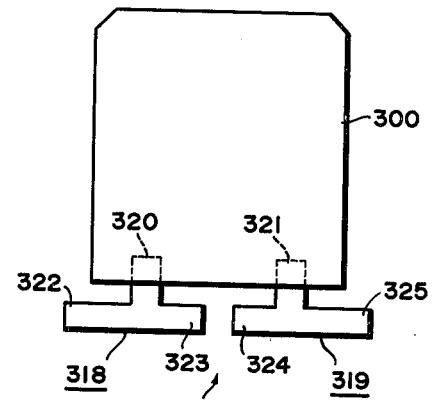
FIGS. 10, 11, 12 and 13 show other embodiments of the capacitor.

Embodiments of the capacitor having different lead structure will now be explained. FIG. 10 shows an embodiment in which a pair of leads are arranged in the same plane. In FIG. 10, leads 318 and 319 are arranged in the same plane to form a four-terminal configuration. The leads 318 and 319 include arms 320 and 321 which are connected to electrodes (not shown) of a capacitance portion of a body 300 of a capacitor 30, and arms 322, 323 and 324, 325 which are connected to the lines B and E.

Figure 11:
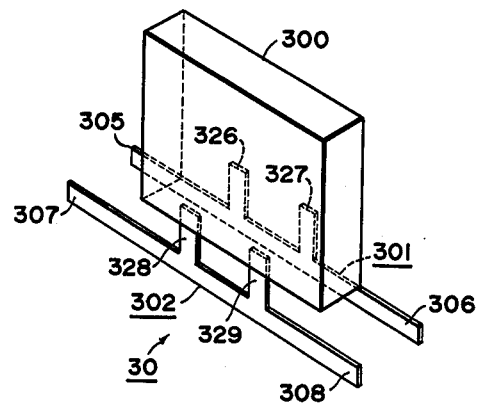

FIG. 11 shows an improved structure of the capacitor shown in FIG. 7, in which the each of the arms to be connected to the electrodes of the capacitance portion is constructed with two sub-arms to reinforce the arms which are inherently weak in mechanical structure. In FIG. 11, leads 301 and 302 are provided with pairs of sub-arms 326, 327 and 328, 329, respectively, which are connected to the electrodes of the capacitance portion. The paired sub-arms 326, 327 and 328, 329 correspond to the arms 303 and 304 in FIG. 7, respectively. The paired sub-arm structure is advantageous over the single arm structure because the latter has a disadvantage in that the connection point with the electrode may be broken or taken off when it is used in a vibrating environment or in a mechanical pressure environment.

Figure 12:
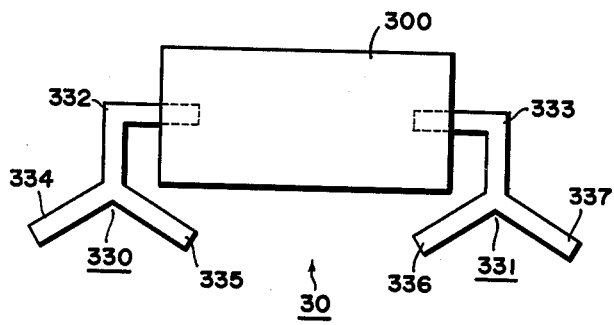

FIG. 12 shows another embodiment. In all of the previous embodiments the two arms to be connected to the lines B and E lie in the same line. In the embodiment of FIG. 12, pairs of arms 334, 335 and 336, 337 of leads 330, 331 which are to be connected to the lines B and E are arranged to make a predetermined angle to each other. Of course, ends of the arm 332 and 333 are connected to the electrodes of the capacitance portion. This arrangement is advantageous over the previous embodiment in the easiness of connection of the leads.

Figure 13:
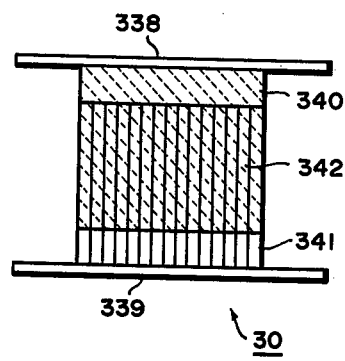

Each of the leads shown in FIGS. 7, 10, 11 and 12 has the arm to be connected to the electrode. Although the length of the arm can be shortened, the arm still includes an inductive component so long as it has an finite length. FIG. 13 shows an embodiment of a capacitor which has completely eliminated such arm. In FIG. 13, a dotted hatched area 340 represents a first electrode which constitutes a part of a capacitance portion, and dotted vertical line area 341 represents a second electrode which is counter-electrode to the first electrode. The overlapped area 342 of the electrodes 340 and 341 form an effective capacitance portion. Leads 338 and 339 are directly connected to the electrodes 340 and 341. With this arrangement, the leads 338 and 339 form parts of the lines B and E and the arms shown in FIGS. 7, 10, 11 and 12 are no longer required. According to this embodiment, because it lacks the arms, an ideal capacitor which exhibits only capacitive component can be provided.

What is claimed is:

1. An electric power source apparatus for vehicles comprising:

a dynamo including a rotor driven by a vehicle mounted engine, an exciting coil to which an exciting current is supplied, an armature coil across which a voltage is generated, and an output means for leading the voltage generator across the armature coil to externally utilization means;

a first line having one end thereof connected to said output means of said dynamo;

a second line having one end thereof connected to one end of said exciting coil;

a third line having one end thereof connected to the other end of said exciting coil;

a storage cell connected across said first and third lines;

a voltage regulator including relay coil means connected to said first line and adapted to be excited in accordance with the magnitude of voltage applied thereto through said first line, contact means switched in response to the excitation of said relay coil means, and a resistor connected across the other ends of said second and third lines for developing voltage thereacross by the switching of said contact means, whereby said resistor connected to said second or third lines to supply the exciting current to the exciting coil of the dynamo; and a four terminal capacitor coupled to said first and third lines for absorbing high frequency noise generated on said first and third lines in response to the switching of said contact means of said regulator, said capacitor comprising:

a pair of overlapping capacitor electrodes; and a pair of leads, each of said leads being electrically coupled along one edge of one of said capacitor electrodes, each of said leads having two ends thereby forming a four terminal circuit.

* * * * *